Jan. 31, 1928.
R. S. BLAIR
OPTICAL PROJECTION
Filed March 16, 1923
1,657,878
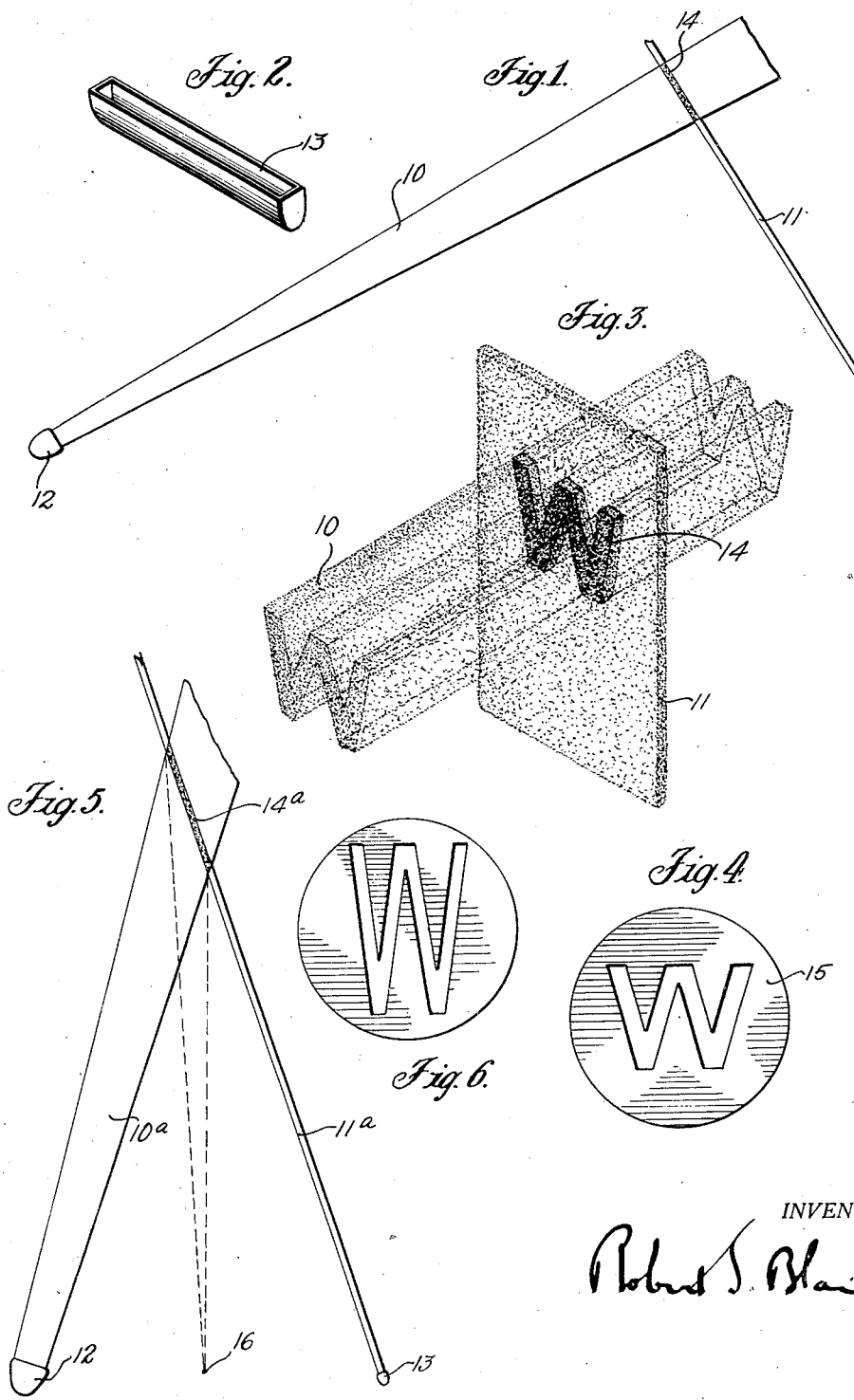
INVENTOR
Robert S. Blair Patented Jan. 31, 1928.

1,657,878

UNITED STATES PATENT OFFICE.

ROBERT S. BLAIR, OF STAMFORD, CONNECTICUT.

OPTICAL PROJECTION.

Application filed March 16, 1923. Serial No. 625,452.

This invention relates to optical projections and the like. One of the objects thereof is to provide a practical and effective art whereby desired visual effects may be obtained through the use of projecting devices or the like. Another object is to provide an art of the above nature whereby light rays are utilized to produce predetermined outlines of ready visibility. Another object is to provide means efficient in action adapted to project light and control the projection thereof in such manner as to produce visual effects of predetermined character. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawing in which are shown one or more of the various possible embodiments of the several features of this invention, Figure 1 is a side elevation diagrammatically representing two intersecting beams of light and the projecting devices therefor;

Figure 2 is a perspective of a reflector employed in Fig. 1;

Figure 3 is a fragmentary perspective in enlarged detail of the intersecting beams shown in Fig. 1;

Figure 4 is a front elevation of one of the projecting devices employed in Fig. 1;

Figure 5 is a view similar to Fig. 1 showing a modification; and

Figure 6 is a front elevation of a projecting device employed in Fig. 5.

Similar reference characters refer to similar parts throughout the several views of the drawing.

Referring now to the drawing in detail, in Fig. 1 there are shown two beams of light 10 and 11, the beam 10 being projected from a source of light positioned before a reflector 12, and the beam 11 being projected from a source of light positioned before a reflector 13, the two beams intersecting or crossing each other at 14. The beam 11 is preferably projected in a thin sheet-like beam and this may be accomplished by the use of a trough-like reflector, for example such as is shown in Fig. 2. The reflector 13 is preferably of substantially parabolic cross section, and by placing the source of light substantially at the focus of the parabola, substantially parallel ray projection may be obtained to project a narrow sheet-like wall of light, as shown. A carbon arc, such as employed in search-lights, for example, may form the source of light and, if desirable, a plurality of such sources may be spaced at intervals along the trough-like reflector 13, each being substantially at the focus of the parabola.

In Fig. 3 the two intersecting beams of light 10 and 11 are shown in larger detail, and it is seen that the beam 10 is of a distinct predetermined cross section, for example, the shape of a letter of the alphabet, as shown. Such a beam may be projected by projecting the light from the reflector 12 through a stencil 15, as shown in Fig. 4, the stencil 15 being positioned in front of the reflector and permitting exit of only those rays which pass through the stencil outline. The reflector 12 is preferably of substantially parabolic shape to provide substantially parallel ray reflection, and the inner side of the stencil 15 is preferably blackened to absorb light rays striking its surface about the openings therein. Openings tracing any desired figures or letters or the like may be provided in the stencil 15 to project a beam or beams of any desired cross section. The rays from the reflector 12 may be projected in a diverging manner by adjusting the position of the light source with respect to the focus of the parabola and thus the cross section of the beam of light, and hence the size of the figure traced thereby, will increase along the length of the beam. It is to be understood that other means may be employed to project a beam of light of the desired cross section; for example, a plurality of individual projectors may be arranged so that their combined effect is to produce a beam of the desired section.

A beam of light projected through the atmosphere normally traces a visible path, the effect being due to the illumination of the particles in the atmosphere and the reflection of the light therefrom to the eye. At the points 14 where the two beams of light 10 and 11 intersect or cross the atmosphere is illuminated by the combined intensities of the two beams of light; hence, where the beam 10 passes through the beam 11 a portion of the atmosphere illuminated by the latter is additionally illuminated by the former and, as is represented in Fig. 3, a visible outline the shape of the cross section of the beam of light 10 is produced. Since, as before explained, the beam 10 may be given any desired cross section, it will be seen that at the intersection of the two beams of light any desired outline may be visibly traced. Preferably, one or both of the beams of light are colored, for example by passing them through a glass of the desired color positioned adjacent the reflectors. The illumination of the atmosphere by the combined intensities of the two beams of light of different colors thus produces an illumination of a third color at the intersection of the two beams tracing the desired outline.

A beam of light projected as from a search-light or the like as above mentioned normally illuminates the particles in the atmosphere and thus traces a visible path therethrough. However, to an observer stationed near the source of light, the beam therefrom is substantially invisible until it reaches a distant point. Referring now to Fig. 5, the two projecting reflectors 12 and 13 are shown relatively close together, projecting beams 10ª and 11ª intersecting at a relatively sharp angle at 14ª. To an observer positioned at the point 16, for example, relatively close to the two sources 12 and 13, the beams 10ª and 11ª are substantially invisible for a distance from their sources, as is indicated by the dotted lines. At the intersection 14ª of the two beams, however, their combined intensities illuminate the atmosphere to such an extent as to be readily visible to the observer at the point 16. Hence, the beam 10ª being of a predetermined cross section, as the beam 10 described above, the combination of the two invisible beams where the beam 10ª passes through the beam 11ª results in a visible outline of the shape desired. In this case since the observer is viewing the result at a sharp angle the letters or other figures traced by the stencil positioned before the source 12 may be elongated as shown in Fig. 6. The outline traced by the intersection of the two beams of light will then appear in substantially normal proportions to the observer stationed at the point 16.

From the above it will be seen that there are herein provided an art and means for carrying out the same which embody the features of this invention and attain the objects thereof.

As many possible embodiments may be made of the mechanical features of the above described invention and as the art herein described might be varied in various parts, all without departing from the scope of the invention, it is to be understood that all matter herein set forth or shown in the accompanying drawings is to be interpreted as illustrative and not in a limiting sense.

I claim as my invention:

1. The herein described art which consists in projecting in intersecting directions a pair of beams of light of such cross-section that their intersection will form an intelligible character and of such different colors that their intersection will be illuminated in a third color.

2. The herein described art which consists in projecting a flat sheet of light of a predetermined color, projecting to intersect with said sheet of light a beam of light having a cross-section of an intelligible character and of such a color different from that of the sheet of light as will cause the area of intersection to be illuminated in a third color.

3. In apparatus of the class described, in combination, means adapted to project into the air a flat sheet of light of a predetermined color, means adapted to project a beam of light into intersection with said sheet, means adapted to so form the beam of light as to give the cross-section thereof an area having an intelligible character, and means adapted to so color said beam of light as will give it a color of such different character from that of said sheet that the intersection will be illuminated in a third color.

In testimony whereof, I have signed my name to this specification this 15th day of March, 1923.

ROBERT S. BLAIR.